US008654822B2

(12) United States Patent
Kim et al.

(10) Patent No.: US 8,654,822 B2
(45) Date of Patent: Feb. 18, 2014

(54) LINK ADAPTATION SYSTEM USING DOPPLER FREQUENCY AND METHOD USING THE SAME

(75) Inventors: Young Soo Kim, Seoul (KR); Kyung Hun Jang, Suwon-si (KR); In Sun Lee, Seoul (KR); Jung Woo Lee, Seoul (KR); Hyo Sun Hwang, Seoul (KR); Hyun Gi Ahn, Incheon (KR); Chan Hong Kim, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1143 days.

(21) Appl. No.: 12/034,959

(22) Filed: Feb. 21, 2008

(65) Prior Publication Data
US 2009/0052512 A1 Feb. 26, 2009

(30) Foreign Application Priority Data

Aug. 21, 2007 (KR) .................. 10-2007-0083822

(51) Int. Cl.
*H04B 1/38* (2006.01)
*H04L 5/16* (2006.01)
(52) U.S. Cl.
USPC .......................... 375/220; 375/268; 375/279
(58) Field of Classification Search
USPC .............. 375/227, 130, 220, 268, 271, 279
See application file for complete search history.

(56) References Cited

U.S. PATENT DOCUMENTS

| 6,215,827 | B1 * | 4/2001 | Balachandran et al. ....... 375/262 |
| 2002/0000948 | A1 * | 1/2002 | Chun et al. .................... 343/853 |
| 2002/0044593 | A1 | 4/2002 | Kuo |
| 2002/0099529 | A1 * | 7/2002 | Tang ................................ 703/22 |
| 2005/0025254 | A1 * | 2/2005 | Awad et al. .................... 375/295 |
| 2008/0089259 | A1 * | 4/2008 | Yang et al. ..................... 370/311 |
| 2008/0107048 | A1 * | 5/2008 | Jalali et al. .................... 370/280 |
| 2008/0107158 | A1 * | 5/2008 | Yoshii et al. ................... 375/146 |
| 2008/0132172 | A1 * | 6/2008 | Yoshii et al. ................ 455/67.11 |
| 2010/0202399 | A1 * | 8/2010 | Catreux-Erceg et al. ..... 370/329 |

FOREIGN PATENT DOCUMENTS

| EP | 1 207 633 A1 | 5/2002 |
| JP | 2004-159284 | 6/2004 |
| KR | 2004-57682 | 7/2004 |
| KR | 2004-58784 | 7/2004 |
| KR | 10-474315 | 2/2005 |
| KR | 2005-78557 | 8/2005 |
| KR | 10-2007-0033115 A | 3/2007 |
| WO | WO 03/056724 | 7/2003 |

OTHER PUBLICATIONS

Korean Office Action issued Aug. 5, 2013 in counterpart Korean Application No. 10-2007-0083822 (4 pages, in Korean).

* cited by examiner

*Primary Examiner* — Chieh M Fan
*Assistant Examiner* — Freshteh N Aghdam
(74) *Attorney, Agent, or Firm* — NSIP Law

(57) ABSTRACT

A link adaptation system using a Doppler frequency is provided. The link adaptation system includes: a Doppler frequency estimation unit to estimate a Doppler frequency of a signal transmitted via a wireless channel; a Signal to Noise Ratio (SNR) measurement interval determination unit to determine an SNR measurement interval of the signal transmitted via the wireless channel based on the estimated Doppler frequency; and an SNR measurement unit to measure an SNR of the signal based on the determined SNR measurement interval.

15 Claims, 5 Drawing Sheets

FIG. 4

| MCS LEVEL MODE | MODULATION | CODE RATE | DATA RATE |
|---|---|---|---|
| 1 | BPSK | 1/2 | 6Mbps |
| 2 | BPSK | 3/4 | 9Mbps |
| 3 | QPSK | 1/2 | 12Mbps |
| 4 | QPSK | 3/4 | 18Mbps |
| 5 | 16QAM | 1/2 | 24Mbps |
| 6 | 16QAM | 3/4 | 36Mbps |
| 7 | 64QAM | 2/3 | 48Mbps |
| 8 | 64QAM | 3/4 | 54Mbps |

LINK ADAPTATION SYSTEM USING DOPPLER FREQUENCY AND METHOD USING THE SAME

CROSS-REFERENCE TO RELATED APPLICATION

This application claims the benefit of Korean Patent Application No. 2007-83822, filed on Aug. 21, 2007 in the Korean Intellectual Property Office, the disclosure of which is incorporated herein by reference.

BACKGROUND OF THE INVENTION

1. Field of the Invention

Aspects described herein relate to a link adaptation system and method which can adaptively cope with a changing wireless environment when the wireless environment including a location of a mobile terminal and the like is changed.

2. Description of the Related Art

A state of a wireless channel continuously changes depending on a location of a mobile terminal, a time, and a feature of fading. Accordingly, coping with the state of the changing wireless channel is needed for transceiving a large amount of data via a wireless link. Various methods are suggested in order to transceive data at high-speed, even when the state of the wireless channel changes.

In particular, research on a link adaptation method including an Auto-Rate FallBack (ARF) method is actively underway. The ARF method denotes a method of selecting a Modulation Coding Scheme (MCS) level in which a data rate is decreased when a source node fails to receive an Acknowledgement (ACK) message from a destination node at least a predetermined number of times.

The ARF method has a problem in that the MCS level cannot be quickly selected since whether the ACK message fails to be received the least a predetermined number of times is needed to be determined. Accordingly, the ARF method has a drawback of not easily coping with a change of the wireless channel due to a movement of the mobile terminal.

Also, a Signal to Noise Ratio (SNR) can be considered when the appropriate MCS level coping with the changing wireless channel is selected. Also, when the MCS level is selected based on the easily measured SNR, the SNR cannot be corrected when there is an error in the measured SNR. Accordingly, there is a problem in that the inappropriate MCS level is selected and the MCS level different from an actual channel is selected.

Also, since a method of selecting the MCS level based on the SNR needs to frequently measure the SNR due to the changing wireless channel corresponding to each data packet to be transmitted, hardware complexity is high and a load on a communication system is great.

Accordingly, a link adaptation system and method which can reduce the hardware complexity due to a need for frequently measuring the SNR, reduce the load on the communication system, and efficiently adapt to a changing wireless environment is needed.

SUMMARY OF THE INVENTION

Aspects described herein provide a link adaptation system and method which can reduce a number of Signal to Noise Ratio (SNR) measurements by estimating a Doppler frequency and determining an SNR measurement interval based on the Doppler frequency.

A general aspect also provides a link adaptation system and method which can reduce hardware complexity, and reduce a load on a communication system by maintaining a number of SNR measurements to a minimum during determined SNR measurement intervals.

A general aspect also provides a link adaptation system and method which can select a Modulation Coding Scheme (MCS) level corresponding to an actual wireless channel by estimating a state change of the wireless channel based on a Doppler frequency even though a number of SNR measurements is reduced.

A general aspect also provides a link adaptation system and method which can efficiently implement an SNR-based MCS level selection algorithm by estimating a coherence time of a wireless channel based on a Doppler frequency, and determining an SNR measurement interval using the coherence time.

According to one general aspect, there is provided a link adaptation system, the system including a Doppler frequency estimation unit to estimate a Doppler frequency of a signal transmitted via a wireless channel, an SNR measurement interval determination unit to determine an SNR measurement interval of the signal transmitted via the wireless channel based on the estimated Doppler frequency, and an SNR measurement unit to measure an SNR of the signal based on the determined SNR measurement interval.

The system may provide that the link adaptation system further includes: an MCS level selection unit to select an MCS level corresponding to the wireless channel using the measured SNR.

The system may provide that the SNR measurement interval determination unit determines the SNR measurement interval by estimating a state change of the wireless channel based on the Doppler frequency.

The system may provide that the SNR measurement interval determination unit estimates a coherence time of the wireless channel based on the Doppler frequency, and determines the SNR measurement interval using the estimated coherence time.

The system may provide that, when the estimated Doppler frequency is less than a predetermined level, the SNR measurement interval determination unit is enabled, and when the estimated Doppler frequency is greater than or equal to the predetermined level, the SNR measurement interval determination unit determines the SNR measurement interval as a length of a transmission data packet.

The system may provide that the SNR measurement unit measures the SNR of the signal once for each of the determined SNR measurement intervals.

The system may provide that the MCS level selection unit selects any one of a first MCS level corresponding to the measured SNR and at least one MCS level adjacent to the first MCS level as the MCS level corresponding to the wireless channel.

The system may provide that the MCS level selection unit selects any one of the first MCS level and the at least one adjacent MCS level as the MCS level depending on whether an Acknowledgement (ACK) message is received from a receiving node.

According to another general aspect, there is provided a link adaptation method, the method including estimating a Doppler frequency of a signal transmitted via a wireless channel, determining an SNR measurement interval of the signal transmitted via the wireless channel based on the estimated Doppler frequency, and measuring an SNR of the signal based on the determined SNR measurement interval.

Additional aspects will be set forth in part in the description which follows and, in part, will be obvious from the description, or may be learned by practice of the invention.

BRIEF DESCRIPTION OF THE DRAWINGS

These and/or other aspects will become apparent and more readily appreciated from the following description of the embodiments, taken in conjunction with the accompanying drawings of which:

FIG. 4 illustrates an example of a Modulation Coding Scheme (MCS) table; and

DETAILED DESCRIPTION OF EMBODIMENTS

Figure 1:
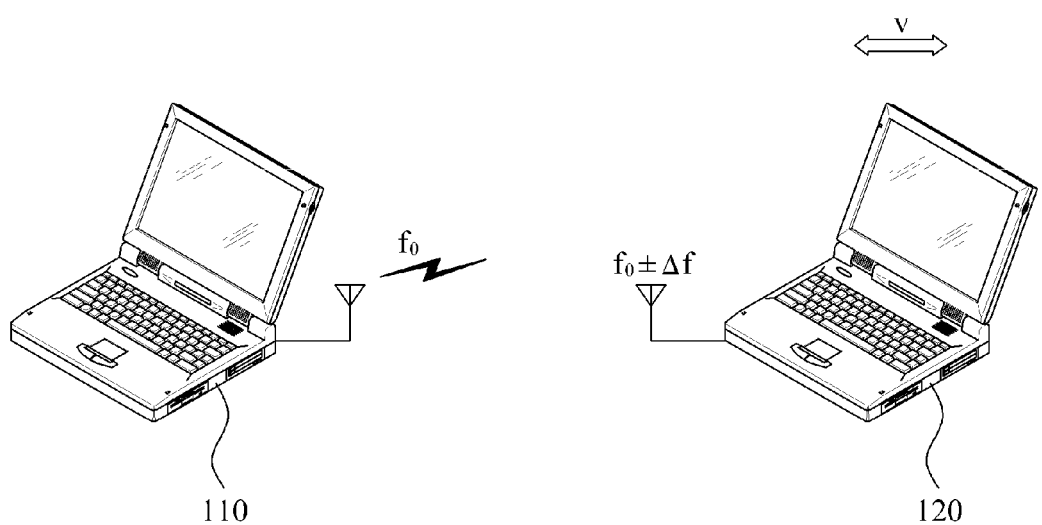
FIG. 1 illustrates an example of moving mobile terminals.

Reference will now be made in detail to general aspects, examples of which are illustrated in the accompanying drawings, wherein like reference numerals refer to the like elements throughout. The general aspects are described below with reference to the figures.

FIG. 1 illustrates an example of moving mobile terminals.

Referring to FIG. 1, mobile terminals 110 and 120 transceive a data packet via a wireless channel. In this instance, the mobile terminal 110 can transmit the data packet to the mobile terminal 120 by using various Modulation Coding Scheme (MCS) levels. Specifically, since a wireless environment including locations of the mobile terminals 110 and 120, position, and the like, is changed, the mobile terminal 110 can select the MCS level being adaptive to a state of a wireless link and transmit the data packet to the mobile terminal 120 based on the selected MCS level.

When the mobile terminal 110 selects the MCS level, a signal to noise ratio (SNR) of the signal transmitted via the wireless channel can be a selection standard. Specifically, the mobile terminal 110 can select the MCS level appropriate for the wireless channel based on the SNR.

In this instance, the signal transmitted via the wireless channel can be a signal transmitted via a downlink from the mobile terminal 110 to the mobile terminal 120. In this instance, the mobile terminal 120 needs to feed back, to a source node, channel state information related to the SNR so that the mobile terminal 110 may recognize the SNR of the signal transmitted via the downlink.

Also, since a wireless channel of an uplink and a wireless channel of a downlink can be identical in a communication system of a Time Division Duplexing (TDD) method, the mobile terminal 110 can recognize the state of the wireless channel by eliminating a need that the mobile terminal 120 feeds back the channel state information to the mobile terminal 110. Specifically, the mobile terminal 110 can estimate the SNR of the signal transmitted via the uplink from the mobile terminal 120 to the mobile terminal 110 via the uplink by eliminating a need that the mobile terminal 120 feeds back the channel state information. Accordingly, a standard for selecting the MCS level can be determined.

Also, when the mobile terminal 110 transmits the signal having a frequency component $f_0$ and the mobile terminal 120 moves at a speed v, the mobile terminal 120 receives the signal having the frequency component $f_0 \pm \Delta f$ due to a Doppler effect. In this instance, $\Delta f$ is a Doppler frequency, and as v increases, an amount of $\Delta f$ increases. The signal received by the mobile terminal 120 can have a spectrum distribution from $f_0 - \Delta f$ to $f_0 + \Delta f$ in a wireless environment in which fading and a multi-path exist.

In this instance, as a moving speed v of the mobile terminal 120 increases, the Doppler frequency $\Delta f$ increases and the state of the wireless channel is quickly changed. Also, as v decreases, the state of the wireless channel is slowly changed. Accordingly, the state change of the wireless channel can be estimated by estimating the Doppler frequency $\Delta f$.

Figure 2:
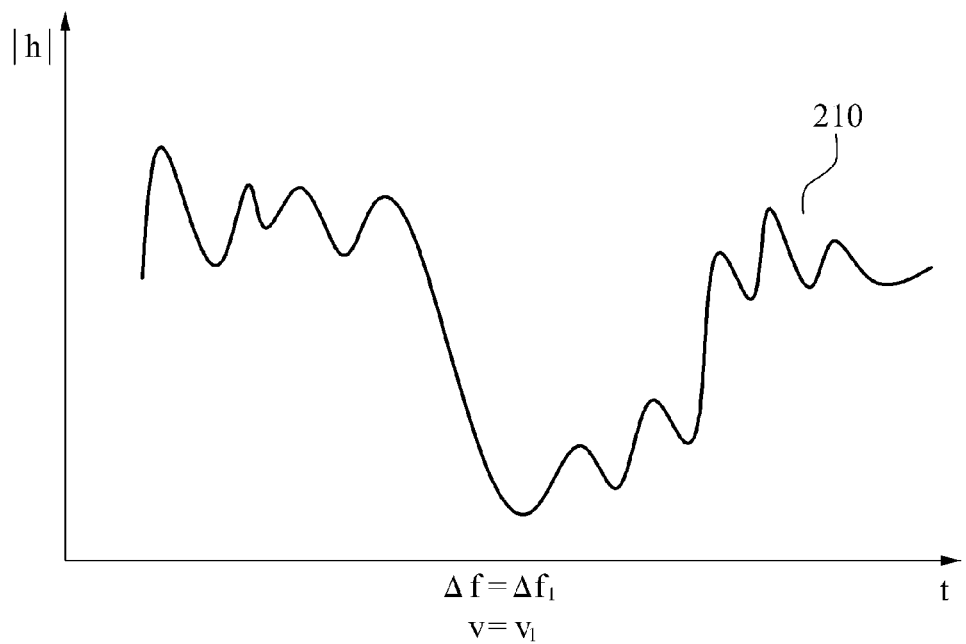
FIG. 2 illustrates an example of a state change of a wireless channel based on a Doppler frequency.
Figure 2:
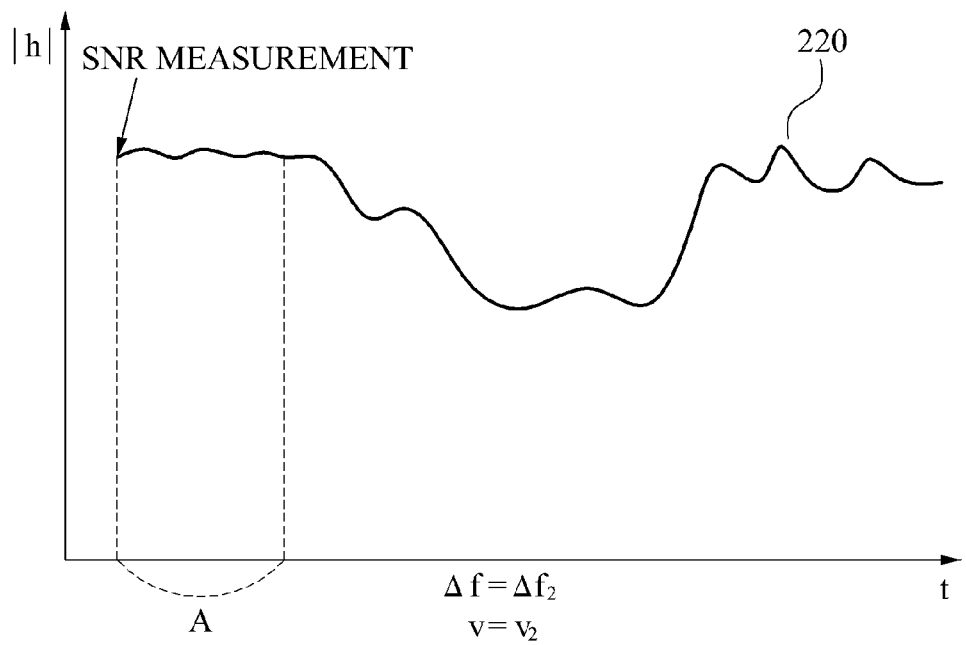

FIG. 2 illustrates an example of a state change of a wireless channel based on a Doppler frequency.

Referring to FIG. 2, a curve 210 illustrates a channel gain $|h|$ of the wireless channel over time in the case of $v=v_1$, and a curve 220 illustrates a change of the channel gain $|h|$ of the wireless channel over time in the case of $v=v_2$. In this instance, $v_1$ and $v_2$ are moving speeds of a mobile terminal, and $v_1$ is greater than $v_2$. Also, $\Delta f_1$ and $\Delta f_2$ are respectively Doppler frequencies generated when the mobile terminal respectively moves at speeds $v_1$ and $v_2$.

When the mobile terminal moves at the speed $v_1$ higher than $v_2$, the Doppler frequency $\Delta f_1$ is generated, and the channel state of the wireless channel is quickly changed. Also, when the mobile terminal moves at the low speed $v_2$, the Doppler frequency $\Delta f_2$ is generated, and the channel state of the wireless channel is slowly changed. In this instance, $\Delta f_1$ is greater than $\Delta f_2$.

Referring to the graph 220, it can be understood that the state change of the wireless channel during an interval A is small. Specifically, it can be understood that the state change of the wireless channel is relatively small in a section A since the Doppler frequency $\Delta f_2$ is less than the Doppler frequency In an algorithm selecting an MCS level based on a Signal to Noise Ratio (SNR), a transmitter generally measures the SNR based on the channel state of the wireless channel by corresponding to each data packet to be transmitted.

Also, when the state change of the wireless channel is estimated by measuring the Doppler frequency, the MCS level appropriate for the channel state of the wireless channel can be selected by eliminating a need for frequently measuring the SNR in the section A determined that the state change of the wireless channel is small.

For example, the SNR initially measured in the section A can be continuously used as the standard of selecting the MCS level for the entire section A. Specifically, the MCS level selected by the initially measured SNR can be used for many data packets to be transmitted in the section A. Accordingly, measuring the SNR in order to select the MCS level for each data packet is unnecessary.

Since the state change of the wireless channel is relatively small and within a predetermined range, a time of considering the channel state of the wireless channel as constant is referred to as a coherence time.

Figure 3:
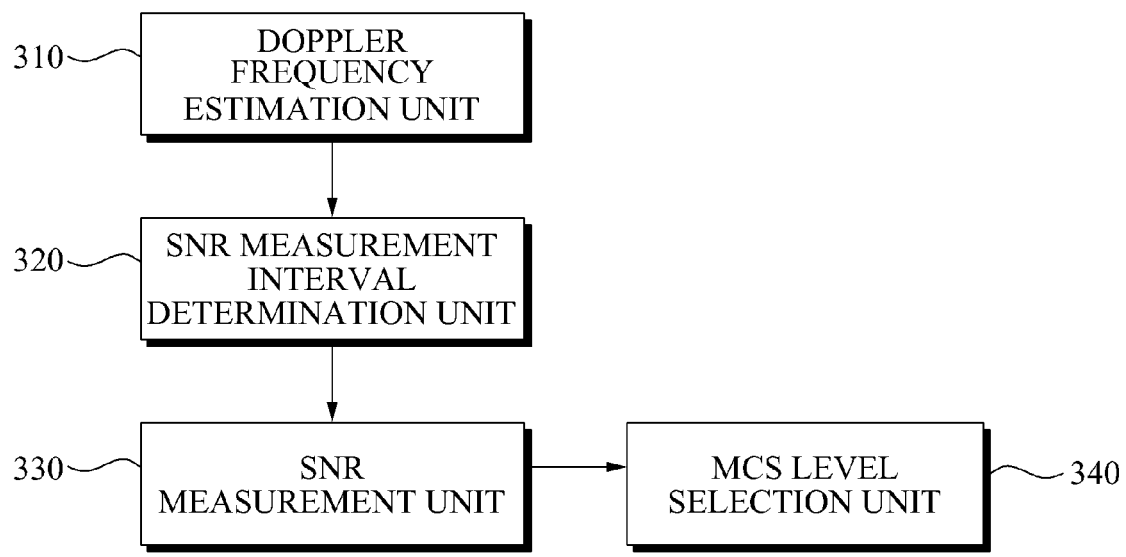
FIG. 3 is an example of a block diagram illustrating a link adaptation system.

FIG. 3 is an example of a block diagram illustrating a link adaptation system.

Referring to FIG. 3, the link adaptation system includes a Doppler frequency estimation unit 310, an SNR measurement interval determination unit 320, an SNR measurement unit 330, and an MCS level selection unit 340.

The Doppler frequency estimation unit 310 estimates a Doppler frequency of a signal transmitted via a wireless channel. For example, even though a transmission terminal transmits a carrier wave of a frequency $f_0$, a receiving terminal receives a signal of a frequency $f_0 \pm \Delta f$. In this instance, the Doppler frequency estimation unit 310 estimates the Doppler frequency $\Delta f$.

Also, the SNR measurement interval determination unit 320 determines an SNR measurement interval of the signal transmitted via the wireless channel based on the estimated Doppler frequency. In this instance, the SNR measurement interval determination unit 320 determines the SNR measurement interval by estimating a state change of the wireless channel based on the Doppler frequency.

For example, since the state change of the wireless channel is estimated to be great when the Doppler frequency is estimated to be great, the SNR measurement interval determination unit 320 enables the SNR to be frequently measured by determining the SNR measurement interval as short. Conversely, since the state of the wireless channel is slowly changed when the Doppler frequency is estimated to be small, the SNR measurement interval determination unit 320 determines an interval to measuring the next SNR to be long. Accordingly, as the SNR measurement interval increases, a number of SNR measurements decreases. Therefore, a load on a communication system and hardware complexity can be significantly reduced.

In this instance, the SNR measurement interval determination unit 320 estimates a coherence time of the wireless channel based on the Doppler frequency, and determines the SNR measurement interval using the estimated coherence time.

Specifically, the SNR measurement interval determination unit 320 calculates the coherence time being a section where the channel state of the wireless channel can be constant, based on the estimated Doppler frequency. When the coherence time is calculated, since the channel state of the wireless channel can be constant in the interval corresponding to the coherence time, the number of SNR measurements in the interval can be reduced.

For example, the SNR is measured once in the interval corresponding to the coherence time, and the once-measured SNR can be used for selecting the MCS level during the interval. When the coherence time is long, the number of SNR measurements can be significantly reduced.

In this instance, when the estimated Doppler frequency is less than a predetermined level, the SNR measurement interval determination unit 320 is enabled, and when the estimated Doppler frequency is greater than or equal to the predetermined level, the SNR measurement interval determination unit 320 determines the SNR measurement interval as a length of a transmission data packet.

For example, a case where A Hz is established as a standard level is assumed. In this instance, when the estimated Doppler frequency is (A+1000) Hz, the SNR measurement interval determination unit 320 determines the SNR measurement interval as the length of the transmission data packet. This results from estimating the state change of the wireless channel as great when the Doppler frequency is great. In this instance, the SNR is updated for each transmission data packet.

Conversely, when the estimated Doppler frequency is less than A Hz, the SNR measurement interval determination unit 320 is enabled and performs a general operation, and the SNR measurement interval can be determined based on the estimated Doppler frequency.

Also, the SNR measurement unit 330 measures an SNR of the signal transmitted via the wireless channel based on the determined SNR measurement interval. The signal transmitted via the wireless channel of the downlink is received by a receiver and the SNR is measured. Also, the receiver feeds back the measured SNR to the transmitter.

Also, a wireless channel of an uplink and a wireless channel of a downlink can be identical in a communication system of a TDD method. Accordingly, the SNR measurement unit 330 can measure the SNR of the signal transmitted via any one of the wireless channel of the uplink and the wireless channel of the downlink. In this instance, when the SNR of the signal transmitted via the wireless channel of the uplink is measured, the SNR of the wireless channel can be measured without a feedback process.

In this instance, the SNR measurement unit 330 measures the SNR based on the SNR measurement interval. In particular, the SNR measurement unit 330 measures the SNR once for each of the SNR measurement intervals, thereby significantly reducing the number of SNR measurements.

Also, the MCS level selection unit 340 selects an MCS level corresponding to the wireless channel using the measured SNR. An operation of the MCS level selection unit 340 is described in detail with reference to FIG. 4.

FIG. 4 illustrates an example of an MCS table.

Referring to FIG. 4, eight MCS levels, that is, mode 1 through mode 8, exist. Specifically, a modulation method of the MCS level of mode 1 is a Binary Phase Shift Keying (BPSK) method, a code rate is ½, and a data rate is 6 Mbps. Also, the MCS level of mode 6 has a modulation method of 16 Quadrature Amplitude Modulation (QAM), and has a code rate of ¾ and a data rate of 36 Mbps.

Also, the data rate acquired by the SNR changes depending on the MCS level. Specifically, the data rate illustrated in FIG. 4 is acquired in a wireless link environment having the SNR higher than a threshold SNR for each MCS level.

For example, when the MCS level according to mode 6 has a threshold SNR of 20 dB, a data rate 36 Mbps can be acquired in the SNR being greater than or equal to 20 dB. Specifically, when the MCS level according to the mode 6 is selected in the wireless link environment having the SNR being less than 20 dB, the data rate 36 Mbps cannot be acquired.

The MCS level selection unit selects an MCS level corresponding to the wireless channel using the measured SNR. In this instance, the MCS level selection unit selects any one of a first MCS level corresponding to the measured SNR and at least one MCS level adjacent to the first MCS level as the MCS level corresponding to the wireless channel. In this instance, the MCS level selection unit selects any one of the first MCS level and the at least one adjacent MCS level as the MCS level corresponding to the wireless channel depending on whether an Acknowledgement (ACK) message is received from a receiving node.

For example, it is assumed that the first MCS level corresponding to the measured SNR is the MCS level of mode 4. In this instance, the at least one adjacent MCS level can be the MCS level of mode 3 and MCS level of mode 5. Since the MCS level different from the MCS level of mode 4 can correspond to the wireless channel more suitably than the MCS level of other modes, the MCS level selection unit can select the MCS level of mode 3 and MCS level of mode 5.

Specifically, the data packets are respectively transmitted to a receiver according to the MCS level of mode 3, MCS level of mode 4, and MCS level of mode 5, and the MCS level corresponding to the wireless channel best can be selected depending on whether the ACK message is received from the receiver when the signal is transmitted to the MCS level according to any mode.

Also, the MCS level selection unit selects the MCS level considering at least one of a requested data rate and a Packet Error rate (PER).

Figure 5:
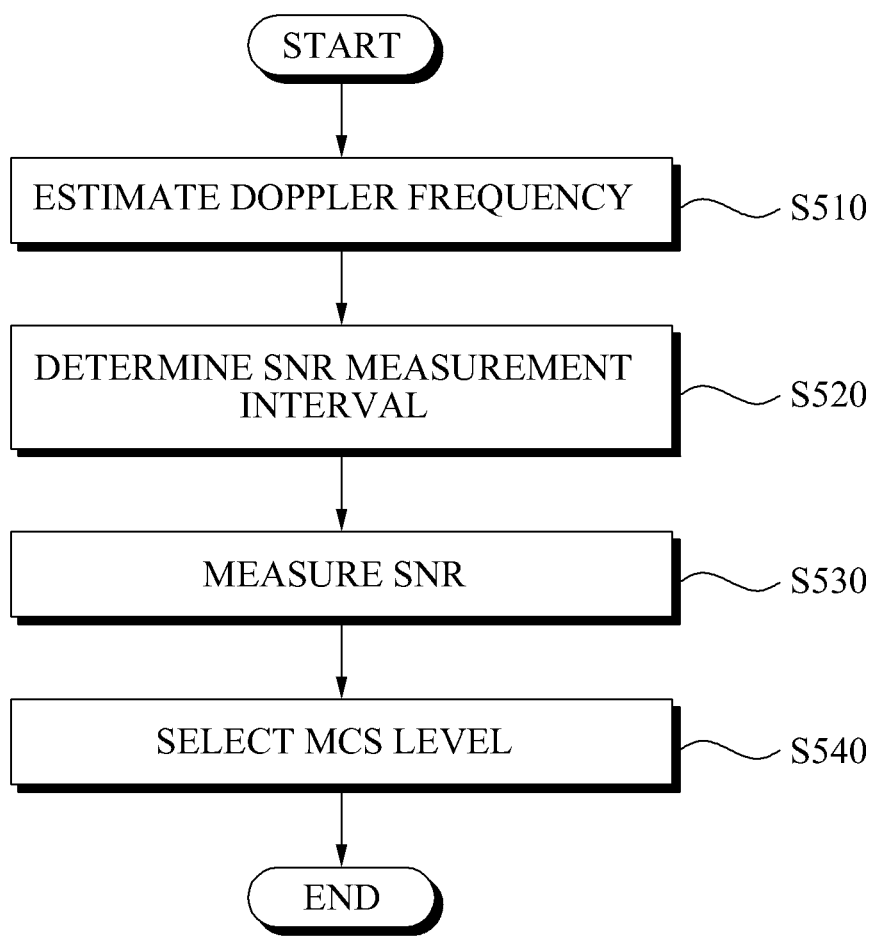
FIG. 5 is an example of a flowchart illustrating a link adaptation method.

FIG. 5 is an example of a flowchart illustrating a link adaptation method.

Referring to FIG. 5, the link adaptation method estimates a Doppler frequency of a signal transmitted via a wireless channel in operation S510.

Also, the link adaptation method determines an SNR measurement interval of the signal transmitted via the wireless channel based on the estimated Doppler frequency in operation S520.

In this instance, the determining in operation S520 determines the SNR measurement interval by estimating a state change of the wireless channel based on the Doppler frequency.

In this instance, the determining in operation S520 estimates a coherence time of the wireless channel based on the Doppler frequency, and determines the SNR measurement interval using the estimated coherence time.

In this instance, when the estimated Doppler frequency is less than a predetermined level, the determining in operation S520 is enabled, and when the estimated Doppler frequency is greater than or equal to the predetermined level, the determining in operation S520 determines the SNR measurement interval as a length of a transmission data packet.

Also, the link adaptation method measures an SNR of the signal based on the determined SNR measurement interval in operation S530.

In this instance, the measuring in operation S530 measures the SNR of the signal once for each of the determined SNR measurement intervals.

Also, the link adaptation method selects an MCS level corresponding to the wireless channel using the measured SNR in operation S540.

In this instance, the selecting in operation S540 selects any one of a first MCS level corresponding to the measured SNR and at least one MCS level adjacent to the first MCS level as the MCS level corresponding to the wireless channel.

In this instance, the selecting in operation S540 selects any one of the first MCS level and the at least one adjacent MCS level as the MCS level depending on whether an ACK message is received from a receiving node.

In this instance, the selecting in operation S540 selects the MCS level considering at least one of a requested data rate and a PER.

Since contents not described with respect to operations of FIG. 5 are similar to the above-description referring to FIGS. 1 through 4, a detailed description thereof is omitted.

The link adaptation method according to the above-described aspects may be recorded in computer-readable media including program instructions to implement various operations embodied by a computer. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described general aspects.

According to the above-described general aspects, there is provided a link adaptation system and method which can reduce a number of SNR measurements by estimating a Doppler frequency and determining an SNR measurement interval based on the Doppler frequency.

Also, according to the above-described general aspects, there is provided a link adaptation system and method which can reduce hardware complexity, and reduce a load on a communication system by maintaining a number of SNR measurements to a minimum during determined SNR measurement intervals.

Also, according to the above-described general aspects, there is provided a link adaptation system and method which can select an MCS level corresponding to an actual wireless channel by estimating a state change of the wireless channel based on a Doppler frequency even though a number of SNR measurements is reduced.

Also, according to the above-described general aspects, there is provided a link adaptation system and method which can efficiently implement an SNR-based MCS level selection algorithm by estimating a coherence time of a wireless channel based on a Doppler frequency, and determining an SNR measurement interval using the coherence time.

The foregoing descriptions have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few examples have been shown and described, it would be appreciated by those skilled in the art that changes may be made to these embodiments without departing from the principles and spirit of the invention, the scope of which is defined by the claims and their equivalents.

What is claimed is:

1. A link adaptation system, comprising:
a Doppler frequency estimation unit configured to estimate a Doppler frequency of a signal transmitted via a wireless channel;
a Signal to Noise Ratio (SNR) measurement interval determination unit enabled when the estimated Doppler frequency is less than a predetermined level, the SNR measurement interval determination unit being configured to determine an SNR measurement interval of the signal transmitted via the wireless channel based on the estimated Doppler frequency, and determine the SNR measurement interval as a length of a transmission data packet when the estimated Doppler frequency is greater than or equal to the predetermined level;
an SNR measurement unit configured to measure an SNR of the signal based on the determined SNR measurement interval; and
a Modulation Coding Scheme (MCS) level selection unit configured to select an MCS level corresponding to the wireless channel using the measured SNR, the MCS level selection unit being further configured to select any one of a first MCS level corresponding to the measured SNR and at least one MCS level adjacent to the first MCS level as the MCS level corresponding to the wireless channel,
wherein, when the estimated Doppler frequency is less than the predetermined level, the SNR measurement interval determination unit determines the SNR measurement interval to be short when the estimated Doppler frequency increases, and determines the SNR measurement interval to be long when the estimated Doppler frequency decreases.

2. The system of claim 1, wherein the SNR measurement interval determination unit is further configured to estimate a state change of the wireless channel based on the estimated Doppler frequency to determine the SNR measurement interval.

3. The system of claim 1, wherein the SNR measurement interval determination unit is further configured to:
   estimate a coherence time of the wireless channel based on the Doppler frequency; and
   determine the SNR measurement interval using the estimated coherence time.

4. The system of claim 1, wherein the determined SNR measurement interval is one of a plurality of SNR measurement intervals determined by the SNR measurement interval determination unit, and
   wherein the SNR measurement unit is further configured to measure the SNR of the signal once for each of the determined SNR measurement intervals.

5. The system of claim 1, wherein the MCS level selection unit is further configured to select the MCS level considering at least one of a requested data rate and a Packet Error rate (PER).

6. The system of claim 1, wherein the MCS level selection unit is further configured to select any one of the first MCS level and the at least one adjacent MCS level as the MCS level depending on whether an Acknowledgement (ACK) message is received from a receiving node.

7. A link adaptation method, the method comprising:
   estimating a Doppler frequency of a signal transmitted via a wireless channel;
   determining a Signal to Noise Ratio (SNR) measurement interval of the signal transmitted via the wireless channel based on the estimated Doppler frequency, the determining of the SNR measurement interval being enabled when the estimated Doppler frequency is less than a predetermined level, the SNR measurement interval being determined as a length of a transmission data packet when the estimated Doppler frequency is greater than or equal to the predetermined level; and
   measuring an SNR of the signal based on the determined SNR measurement interval,
   wherein, when the estimated Doppler frequency is less than the predetermined level, the determining further determines the SNR measurement interval to be short when the estimated Doppler frequency increases, and determines the SNR measurement interval to be long when the estimated Doppler frequency decreases.

8. The method of claim 7, wherein the determining of the SNR measurement interval comprises estimating a state change of the wireless channel based on the estimated Doppler frequency.

9. The method of claim 7, wherein the determining of the SNR measurement interval comprises:
   estimating a coherence time of the wireless channel based on the Doppler frequency; and
   determining the SNR measurement interval using the estimated coherence time.

10. The method of claim 7, wherein the determined of the SNR measurement interval comprises determining a plurality of SNR measurement intervals, the plurality of SNR measurement intervals including the SNR measurement interval, and
    wherein the measuring of the SNR comprises measuring the SNR of the signal once for each of the determined SNR measurement intervals.

11. The method of claim 7, further comprising:
    selecting a Modulation Coding Scheme (MCS) level corresponding to the wireless channel using the measured SNR.

12. The method of claim 11, wherein the selecting of the MCS level comprises selecting the MCS level considering at least one of a requested data rate and a PER.

13. The method of claim 11, wherein the selecting of the MCS level comprises selecting any one of a first MCS level corresponding to the measured SNR and at least one MCS level adjacent to the first MCS level as the MCS level corresponding to the wireless channel.

14. The method of claim 13, wherein the selecting of the MCS level further comprises selecting any one of the first MCS level and the at least one adjacent MCS level as the MCS level depending on whether an ACK message is received from a receiving node.

15. A non-transitory computer-readable recording medium storing a program for implementing a link adaptation method, the method comprising:
    estimating a Doppler frequency of a signal transmitted via a wireless channel;
    determining a Signal to Noise Ratio (SNR) measurement interval of the signal transmitted via the wireless channel based on the estimated Doppler frequency, the determining of the SNR measurement interval being enabled when the estimated Doppler frequency is less than a predetermined level, the SNR measurement interval being determined as a length of a transmission data packet when the estimated Doppler frequency is greater than or equal to the predetermined level;
    measuring an SNR of the signal based on the determined SNR measurement interval; and
    selecting a Modulation Coding Scheme (MCS) level corresponding to the wireless channel using the measured SNR using any one of a first MCS level corresponding to the measured SNR and at least one MCS level adjacent to the first MCS level,
    wherein, when the estimated Doppler frequency is less than the predetermined level, the determining further determines the SNR measurement interval to be short when the estimated Doppler frequency increases, and determines the SNR measurement interval to be long when the estimated Doppler frequency decreases.

* * * * *